US011368580B2

(12) United States Patent
Saraff et al.

(10) Patent No.: US 11,368,580 B2
(45) Date of Patent: Jun. 21, 2022

(54) SMART HANDLING OF CALL REDIRECTION BASED ON THE OUT-OF-OFFICE MESSAGE OF THE USER

(71) Applicant: Avaya Management L.P., Santa Clara, CA (US)

(72) Inventors: Sunil Saraff, Pune (IN); Sameer Prabhakar Joshi, Pune (IN); Sumita Divakaran, Pune (IN)

(73) Assignee: Avaya Management L.P., Santa Clara, CA (US)

( * ) Notice: Subject to any disclaimer, the term of this patent is extended or adjusted under 35 U.S.C. 154(b) by 102 days.

(21) Appl. No.: 16/864,409

(22) Filed: May 1, 2020

(65) Prior Publication Data

US 2021/0344797 A1    Nov. 4, 2021

(51) Int. Cl.
*H04M 3/42*  (2006.01)
*H04M 3/54*  (2006.01)
*H04L 51/02*  (2022.01)
*G06F 16/33*  (2019.01)

(52) U.S. Cl.
CPC .... *H04M 3/42365* (2013.01); *G06F 16/3344* (2019.01); *H04L 51/02* (2013.01); *H04M 3/543* (2013.01)

(58) Field of Classification Search
CPC .. H04M 3/42365; H04M 3/543; H04M 3/561; H04M 3/567; H04M 2203/20; H04M 2203/35; H04L 51/02; G06F 16/3344
See application file for complete search history.

(56) References Cited

U.S. PATENT DOCUMENTS 7,778,858 B1 * 8/2010 Daily ................ G06Q 10/107
                                                    705/7.15
2021/0051207 A1 * 2/2021 Patel ...................... H04L 51/02

OTHER PUBLICATIONS

Heck, John, and Greg Vaudreuil. "Blended IMS messaging applications." Bell Labs Technical Journal 10.4 (2006): 39-52. (Year: 2006).*
Want, Roy, and Andy Hopper. "Active badges and personal interactive computing objects." IEEE Transactions on Consumer Electronics 38.1 (1992): 10-20. (Year: 1992).*

* cited by examiner

*Primary Examiner* — Sharad Rampuria
(74) *Attorney, Agent, or Firm* — Sheridan Ross P.C.

(57) ABSTRACT

Many users have presence information on more than one system. Maintaining such systems may be burdensome and error prone. By automatically parsing an out-of-office message on a first system (e.g., email) for configuring a second system (e.g., telephony) duplicative work may be avoided as one system configures the other system. Accordingly, an out-of-office text message may be automatically parsed to determine attributes (e.g., start/end of absence) and who to contact for certain issues. The email system may then automatically configure a telephony system to provide voice prompts extracted from the email system and the opportunity for a caller to be routed to delegates telephone numbers based on the delegates identified in the email out-of-office message.

20 Claims, 8 Drawing Sheets

| Candidate | Communications | |
|---|---|---|
| "Alice Smith"" | Emails : 1 last year | ⟵ 506A |
| "Alice Jones" | Emails: most recent (yesterday), 10 this week, 2,538 total | ⟵ 506B |
| "Bob Green" | Last call: (None) | ⟵ 506C |
| "Bob Brown" | Last call: 2 days ago, 25 calls this month, 531 total | ⟵ 506D |

*Fig. 5*

SMART HANDLING OF CALL REDIRECTION BASED ON THE OUT-OF-OFFICE MESSAGE OF THE USER

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for telecommunications and particularly to cross-media type message delivery.

BACKGROUND

Out-of-office responses are a common means by which the sender of an email can receive automatic response, such as notification that the recipient is out of the office ("OOO") or otherwise unable to receive, reply, or address the email until a later time. Optionally, out-of-office responses provide notification on how the sender may receive faster resolution, such as by contacting a delegate identified in the message.

Similarly, a caller to a recipient may hear a prerecorded or generated "greeting" that notifies the caller that the recipient is not currently in the office.

While such systems may notify a party that the particular subject of a call or email may be currently unavailable, the systems only work if diligently maintained. This may be especially burdensome for people who travel frequently and need to maintain both an email and telephone out-of-office response. It may also be error prone, usually due to omission or a failure to update a past out-of-office event. This is particular common for individuals who travel infrequently or who travel with short notice and may have other matters to address.

SUMMARY

Today when user sets an out-of-office reply on email, a caller to that same user may be unaware of the person being out of the office due to a failure to turn on or configure an out-of-office greeting message and/or routing instructions to handle incoming calls. A user who is out of the office may answer the call, such as via a call forwarding feature, but may not be able to address the subject of the call. For example, a caller may request the callee to provide some information or perform an action that is not possible due to the user being out of the office. Accordingly, the user may still provide the name and/or other contact information for a delegate or colleague, but such actions often result in the loss of time, as well as, introduces the potential for error. For example, the delegate may become unavailable, unknown to the callee; the caller may have multiple issues to address which could all be handled by a different party rather than a subset of the issues that the delegate may address, or there may be some misunderstanding of the issue and cause the wrong delegate to be selected. Additionally, this occurs while the callee is out of the office and most likely intending to be engaging in other activities.

In one embodiment, systems and methods are disclosed to gain an understanding of the relationship of the user who is out-of-office and the level of priority or category assigned to his delegate. For example, a user would set an out-of-office message in an email client. This will be detected by a monitoring application, such as a collaboration client, integrated or interfacing with the email client and/or email server (e.g., API, program, etc.). The application may be or be derived from, in whole or in part, natural-language programming (NLP).

The monitoring application may detect the out-of-office message and convert the message into a pop-up message showing details of the out-of-office event. The details may be confirmed or edited by the user. The details may be or comprise information accessed from the email message, such as a "from date" and "until date" and/or delegate's(s') contact information, which may be fetched from the enterprise directory or local contact list.

For an NLP model, a seed set comprising different ways of writing out-of-office text email messages may be utilized and the model trained to get additional information, such as the date when the person returns and/or a delegate for a particular topic, callee (e.g., customer, corporate representative, etc.), and/or other attribute of the call. In one embodiment, this may be forty to fifty different sets of text. Additionally or alternatively, other phrasings may be included (e.g., "on vacation" with "on holiday" etc.). This may include static information (e.g., "for issues regarding 'Project X' call Alice") or dynamic (e.g., "for issues regarding 'Project X' call [if current_time=0800-1759, then 'Alice', if current_time=1800-1159, then "Bob,", else "Charlie"]", "if caller=bronze_level, 'For all issues, text David', if caller=silver_level, "Call Edward," if caller=gold_level, "You will now be connected to Frank.", etc.) As a result, an automatic email notification may be generated.

The automatic resolution of message attributes may fail, or make a determination that has a confidence below a previously determined threshold. For example, if a delegate could not be identified, such as when only a first name is provided matching a plurality of individuals, then the delegate information may be absent or added manually, which may comprise prepopulated options (e.g., all individuals having the first name identified, all individuals having the first name identified and sorted/selected by commonality with the user on prior emails, meetings, and/or phone interactions).

In another embodiment, the collaboration client would send a "PUBLISH" request with the information gathered in the out-of-office form, such as in an XML or other data structure, to a presence server. The presence server receives presence information for a particular user (or subscriber), such as, "on a call," "meeting," "do not disturb," etc. Other users (or other subscribers) then receive updates on their particular communication device(s) that have registered with the presence server.

A telephony/feature server may subscribe to a special package of presence-ooo-email of collaboration clients. Accordingly, upon a collaboration client sending a PUBLISH request, a corresponding NOTIFY would be sent to the telephony/feature server for the user, and including some or all of the data sent in the PUBLISH request.

In another embodiment, a feature server parses the information received from presence server in the NOTIFY and learn the categories or priorities sent for the delegates in email. An interactive voice response (IVR) would generate a greeting or option using this input and will be played whenever an incoming call comes to the user.

This information used to create an IVR message may include, for example: "Thanks for calling X. I am out-of-office from [from_date] returning on [return_date]. In my absence, please choose the correct option to be connected to the appropriate person or leave a message and I will get back to you when I return. Choose 1 to get in touch with Bob for HR operations. Choose 2 to get in touch with Carol for Finance. Choose 3 to get in touch with Doug for Research and Development. Etc."

Based on the option chosen by the user, the IVR would redirect the incoming call to the corresponding person's telephone or other voice-enabled endpoint.

With this method the caller does not have to search for the contact details of the delegates and directly get in touch with the relevant delegate for the user, based on IVR.

There could be a case of the delegate also out-of-office. The feature server would have that data since it contains the information of all out-of-office colleagues. This information could be utilized to omit the options from IVR for the delegates who are out-of-office. If no delegates are available, move the call to voice mail.

These and other needs are addressed by the various embodiments and configurations of the present invention. The present invention can provide a number of advantages depending on the particular configuration. These and other advantages will be apparent from the disclosure of the invention(s) contained herein.

Utilizing the useful information from the out-of-office message to generate the automated choice based message for helping the incoming user to be redirected to the relevant delegate.

In one embodiment, a system is disclosed, comprising: a processor, wherein the processor comprises at least one processing device; a data storage comprising a storage device; a first network interface to a first network; and an input-output component; wherein the processor is configured to: receive, from the input-output component, an out-of-office text message from a user; parse the out-of-office text message to identify a candidate delegate therein; match, in the data storage, a record structure comprising a first record associating a delegate telephony address with the candidate delegate and, upon the matching, identify the candidate delegate as the delegate; access, in the data storage, a record structure comprising a second record associating a user telephony address with the user; format an out-of-office telephony message and further comprising indicia of the delegate and indicia of the telephony address of the delegate; and configure a telephony device to present the out-of-office telephony message to a caller of a call destined for the user telephony device.

In another embodiment, a method is disclosed, comprising: receiving, from an input-output component, an out-of-office text message from a user; parsing the out-of-office text message to identify a candidate delegate therein; matching, in a data storage, a record structure comprising a first record associating a delegate telephony address with the candidate delegate and, upon the matching, identifying the candidate delegate as the delegate; accessing, in the data storage, a record structure comprising a second record associating a user telephony address with the user; formatting an out-of-office telephony message and further comprising indicia of the delegate and indicia of the telephony address of the delegate; and configuring a telephony device to present the out-of-office telephony message to a caller of a call destined for the user telephony device.

In another embodiment, a system is disclosed, comprising: means to receive, from an input-output component, an out-of-office text message from a user; means to parse the out-of-office text message to identify a candidate delegate therein; means to match, in the data storage, a record structure comprising a first record associating a delegate telephony address with the candidate delegate and, upon the matching, identify the candidate delegate as the delegate; means to access, in a data storage, a record structure comprising a second record associating a user telephony address with the user; means to format an out-of-office telephony message and further comprising indicia of the delegate and indicia of the telephony address of the delegate; and means to configure a telephony device to present the out-of-office telephony message to a caller of a call destined for the user telephony device.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 5 depicts a third data structure in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
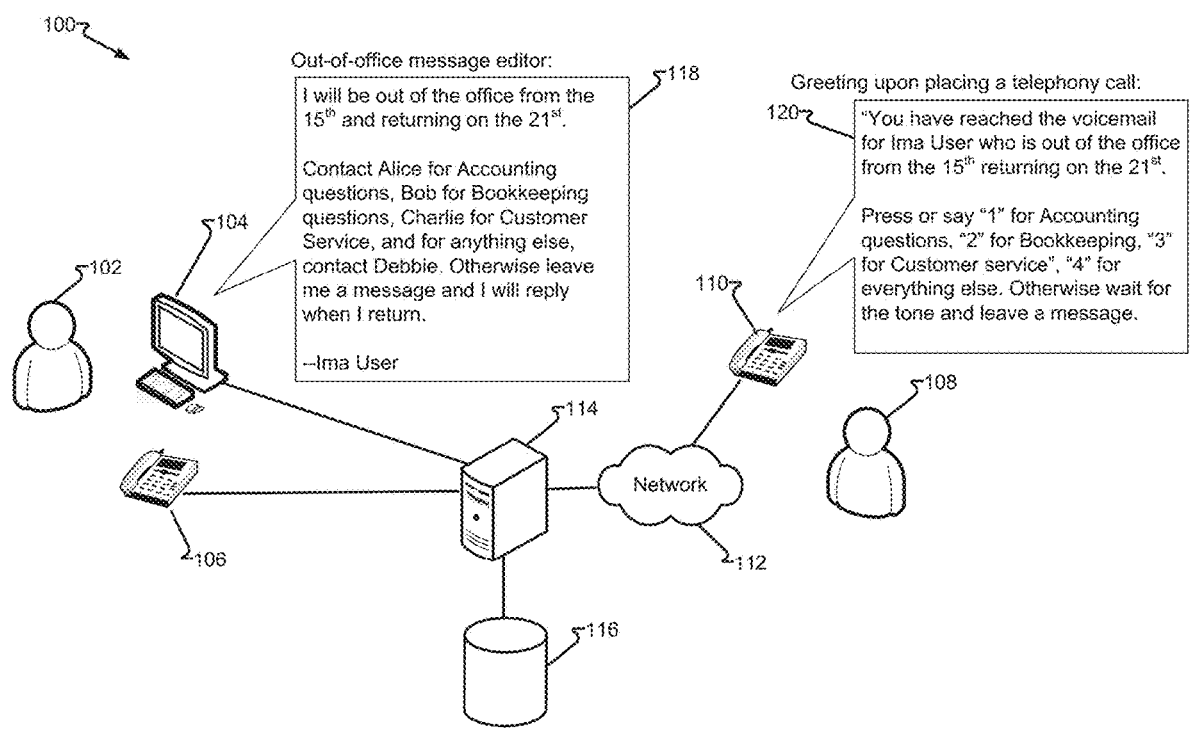
FIG. 1 depicts a first system in accordance with embodiments of the present disclosure.

FIG. 1 depicts system 100 in accordance with embodiments of the present disclosure. In one embodiment, system 100 illustrates components for automatically configuring a telephony system, such as an answering service or application, interactive voice response service, etc., with an input to an email system. It should be appreciated that the components and their particular relationship with other components described herein are provided to promote clarity in describing the embodiments and not as a limitation. For example, email terminal 104 is illustrated as a personal computer and telephone 106 is illustrated as a telephone (analog or digital), but in other embodiments, email terminal 104 and telephone 106 may be provided by the same endpoint, such as a personal computer running a soft phone application, a cellular telephone having both email and voice connectivity, or other hardware. Other aggregations or separations of components are also contemplated, which are described more completely with the embodiments that follow.

In one embodiment, user 102 provides out-of-office email response 118 via email terminal 104, which may be executing an email client or other editor to receive out-of-office email response 118. Server 114 is illustrated as providing both email services and telephony services. Server 114 may provide other services as well, such as presence services. It should be appreciated that server 114 may comprise a plurality of computing and connectivity components, which may be segregated by function, geography, security, or other attribute. When server 114 is segregated, physically or logically, into multiple task-specific servers, such as a feature server providing configuration to a telephony device, such as telephone 106, email terminal 104, dedicated telephony server (e.g., server providing IVR services, call routing, etc.), session initiation protocol (SIP) messages may be exchanged to subscribe and receive out-of-office notifications, such as the occurrence of out-of-office email response 118. Such messages may include a feature server associated with an IVR system or other telephony device handling incoming calls and presenting an audible out-of-office message to the caller. Messages may include the feature server sending a "SUBSCRIBE presence.ooo.email" to a presence server and, in response receiving a "202 Accepted" message and, upon creation of out-of-office email response 118, receive a "NOTIFY" message with the out-of-office text, which may be acknowledge with a "200 OK" message.

Additionally or alternatively, server 114 may be incorporated into other components, such as a computing device configured for use for other purposes (e.g., texting, word processing, etc.), which may include incorporation with or into a communication endpoint, such as email terminal 104 and/or telephone 106. Data storage 116 maintains data (e.g., data structures, instructions for execution by a processor, etc.) which may also be a separate storage device or a storage device incorporated with or into other storage device(s), such as server 114 or other storage component. In another embodiment, server 114 and/or data storage 116 may be a portion of a shared computing and/or storage device, appliance, circuitry, and/or combination thereof, which maybe dedicated to a particular task or user or shared (e.g., storage or computing array, farm, "cloud," etc.). Server 114 may comprise one or more microprocessors (e.g., cores, blades, appliances, etc.) (herein, "processor") having machine-executable instructions to configure the processor. Server 114 may also have networking interfaces, or be in communication with networking interfacing components (e.g., switches, ports, routers, edge devices, etc.) for the management of communication connectivity and facilitating communications between components (e.g., caller telephone 110, email terminal 104, telephone 106, etc.)

Caller 108 may place a call to telephone 106 via network 112 using caller telephone 110. Unless user 102 remembered to set or update their out-of-office greeting, caller 108 may be greeted with a normal message (e.g., "I'm not able to take your call. Leave me a message. <beep>") or an erroneous message that has not been updated (e.g., an out-of-office message from a previous out-of-office event). In accordance with the embodiments described herein, user 102 provides only out-of-office email response 118 and server 114 generates a new greeting, and optionally routing prompts, for the current out-of-office event for user 102.

In order to configure the telephony component, server 114 receives out-of-office email response 118. Out-of-office email response 118 is parsed to determine elements to use in configuring the out-of-office telephony response, such as a greeting or IVR. The elements may include start date of absence, date of return, one or more delegates and roles or purpose for one or more delegates. Additionally or alternatively, default settings may be applied from a group default (e.g., when out-of-office is active, use the company default settings that enables voicemail, provide an option to be connected to a company operator, etc.) and/or individual default settings (e.g., "Always include my administrative assistant as a default option.").

In response to receiving out-of-office email response 118, server 114 configures the telephony component to provide out-of-office voice response 120. This may include one or more selectable prompts for caller 108 to select a particular routing options selected via DTMF entry or voice input to an IVR. The routing options may be to telephony addresses of individuals identified by name, role, or other attribute or groups of individuals (e.g., departments) which may also be identified by name, role, or other attribute. In another embodiment, the specific options may be added, removed, or edited based on identification of caller 108. For example, out-of-office voice response 120 may be configured to use terminology common for internal calls (e.g., "Alice") whereas when caller 108 is determined to be external to the organization, other terminology may be presented (e.g., "Alice Jones in Accounting."). Customizations may be made based on other attributes determined, such as from caller-ID, of caller telephone 110 and/or self-identification of caller 108 (e.g., "please enter your account number."). For example, if a particular value is associated with customers, then customers may be presented with a particular configuration of out-of-office voice response 120 based on that value. Similarly, language, geographic reason, prior call history, etc. may be utilized by server 114 to customize out-of-office voice response 120 for a particular caller 108 or grouping of callers comprising caller 108.

Figure 2:
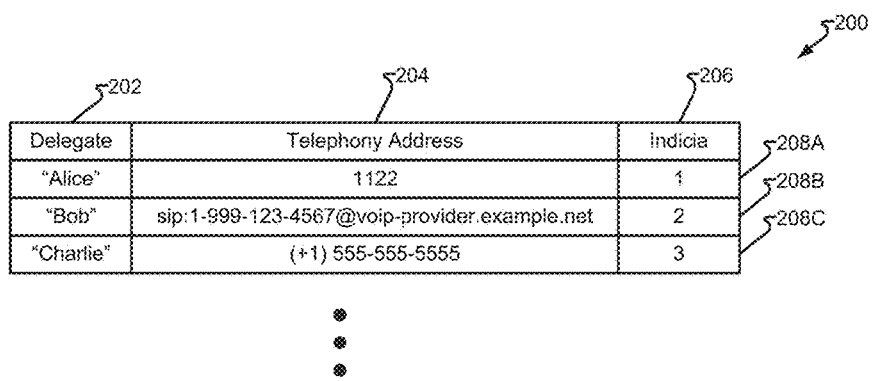
FIG. 2 depicts a first data structure in accordance with embodiments of the present disclosure.

FIG. 2 depicts data structure 200 in accordance with embodiments of the present disclosure. In one embodiment, a processor, such as a component of server 114, may access data structure 200 from a data storage, such as data storage 116. Data structure 200 comprises a delegate identifier field 202, telephony address field 204, and indicia of a telephony address field 206 for each of a number of records 208. Accordingly, the processor may parse out-of-office email response 118 and find reference to a particular delegate or candidate delegate, when the determination of a specific party (individual or group) is less than certain. Once a delegate is identified, the associated telephony address field 204 and indicia of a telephony address field 206 are then access.

The telephony address may comprise the telephony address itself or an index to another data record (not shown) wherein the appropriate telephony address may be selected. For example, record 208A comprises telephony address field 204 having a value of "1122" as may be utilized when one extension on a system calls another extension, such as within the same PBX. Alternatively, the value of telephony address field 204 may be utilized to access another data record wherein alternative telephony number is utilized in at least some circumstances, such as to translate "1122," as an internal extension, to a fully qualified telephony address (e.g., "555-555.1122"). The address within telephony address field 204 may be presented to a caller within the greeting (e.g., "Call Alice at extension 1122" or "Call Alice at 555-555-1122"). In another embodiment, the address within telephony address field 204 is an identifier utilized by a call routing system, such as server 114, such that when the appropriate indicia is selected the routing system may successfully forward the call to the destination. In another embodiment, indicia of the telephony address field 206 comprises a selection means to select a particular delegate, such as responding by pressing a "1" on a keypad of caller telephone 110 to generate a DTMF tone associated with "1" and, as a result, have server 114 connect the call to the value of the telephony address field for record 208A. Similarly, an IVR may be programmed to, upon hearing caller 108 say "1" connecting the call. It should be appreciated that additional or other indicia of the telephony number may be utilized, such as to enable the caller to be prompted, and respond with, a keypad entry, a spoken number, a spoken name (e.g., "Alice"), or other designation for a selected delegate. With data structure 200, a telephony device (e.g., email terminal 104, telephone 106, server 114 executing IVR and/or other greeting, etc.) may be configured from, at least, portions of out-of-office email response 118.

Figure 3:
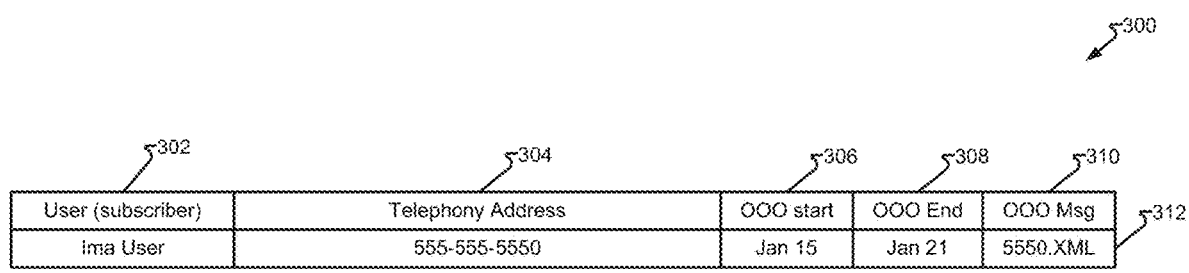
FIG. 3 depicts a second data structure in accordance with embodiments of the present disclosure.

FIG. 3 depicts data structure 300 in accordance with embodiments of the present disclosure. In order to configure the telephony device, the user—a subscriber on the system (e.g., user 102) may be identified as well as one or more telephony addresses. Accordingly, data structure 300 comprises record 312 having user identifier field 302 and telephony address 304 associated with the subscriber. The configured telephony device may then receive a call for the endpoint identified by telephony address field 304 and engage the configured IVR or greeting.

In another embodiment, record 312 may comprise out-of-office start date field 306, out-of-office end date field 308, and/or out-of-office message file identifier field 310. Server 114 may automatically initiate a particular out-of-office message upon the occurrence of the date within out-of-office start date field 306 and may similarly terminate such a message upon the occurrence of the date within the out-of-office end date field 308. The configuration of the telephony device to present a caller with a message may further comprise presenting the telephony device with a data structure, file, or address of a file, such as filed comprising extensible markup language file (XML). The file comprising the configurations as described herein, such as but not limited to, a telephony address (e.g., a value of telephony address field 204) to be connected to the call upon receiving a particular indicia (e.g., a value of telephony address field 204)(see, FIG. 4).

Figure 4:
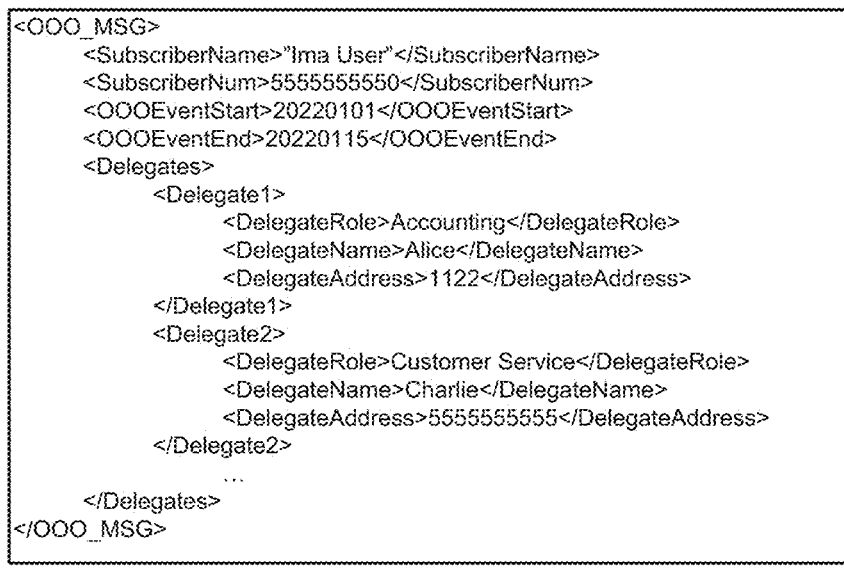
FIG. 4 depicts a configuration file in accordance with embodiments of the present disclosure.

FIG. 4 depicts configuration file 400 in accordance with embodiments of the present disclosure. In one embodiment, a telephony device is configured to answer incoming calls for a subscriber based on server 114 generating a configuration file, such as configuration file 400, for use by the telephony device.

FIG. 5 depicts data structure 500 in accordance with embodiments of the present disclosure. When out-of-office email response 118 is parsed, it may not be clear who the intended delegate is. Accordingly, one or more candidate delegates may be initially considered as the delegate for all or a portion of the out-of-office voice response 120. For example, out-of-office email response 118 may utilize a nickname for a delegate which is absent from a source of personnel information, such as data structure 200 and/or a company directory, which may be in a form such as a Lightweight Directory Access Protocol (LDAP). Other problems occur when a name is used but associations exist with more than one candidate delegate.

In one embodiment, data structure 500 comprises candidate delegate name field 502 and communications field 504 for a number of records 506. A user, such as user 102 is more likely to be less clear when the party is familiar, such as by using a first name or nickname for a coworker that one has frequent interactions with. In contrast, rare encounters are more likely to be formal such as to comprise full names. However, a user may assume who is being referenced by a name, or portion of a name, when that may not always be the case. Accordingly, server 114, in order to configure the telephony device, may access an email history for the user. A more frequent number of emails, the higher weighted the candidate will be.

Accordingly, data structure 500 comprises candidate field 502 and communications field 504 for a number of records 506. Communications field 504 may comprise indicia of the number and type of communications (e.g., email, telephone calls, text, etc.) with a particular entry matching, at least in part, a name or other identifier in candidate field 502.

Additionally or alternatively, server 114 may access a calendaring application and look for meetings. Meetings in a calendar may identify other participants matching, at least in part, a candidate delegate. If meetings are more frequent, a weighting to a name match may then sway the selection of a delegate, from candidate delegates in candidate field 502, based on communications which may include meetings.

Figure 6:
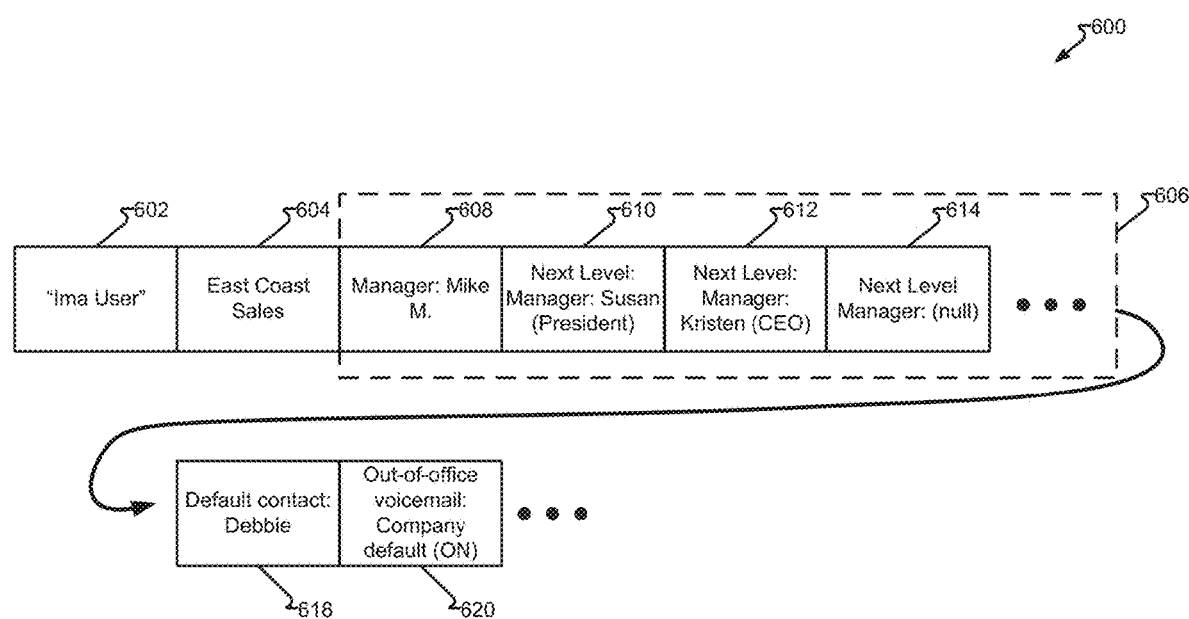
FIG. 6 depicts a fourth data structure in accordance with embodiments of the present disclosure.

FIG. 6 depicts data structure 600 in accordance with embodiments of the present disclosure. In one embodiment, server 114 may attempt to resolve a candidate delegate based on commonality within a particular corporate or other organizational structure. For example, a partial name is more likely to be used to refer to someone more closely related in a corporate hierarchy than to someone who is more distantly related. Accordingly, data structure 600, illustrated as one record, may comprise hierarchical structures and, optionally, default configuration settings which may be corporate set, user set, or corporate set and user overridden.

In one embodiment, data structure 600 comprises user identifier field 602, role field 604, and management block 606. Management block may comprise entries for an entire corporate structure or a portion thereof. For example, manager block 608 may identify an immediate supervisor, and similarly management blocks 610, 612, 614, etc. identify progressively higher levels of management. Additionally or alternatively, management block 606 may comprise one or more entries for peers and/or subordinates. As will be discussed more completely with respect to FIG. 7, a candidate delegate may be weighted more highly in a selection process if they are more closely related in a corporate structure.

In another embodiment, certain settings may be determined as a default, such as by a company administrator or by a user. For example, default contact 618 may be utilized to configure a telephony device as a "catch all" option for a caller, such as to have out-of-office voice response 120 comprise a "for any everything else contact . . . " and indicia of the associated contact. Other settings may include default values, such as default voicemail during an out-of-office event 620. While some companies, and users, may which to allow callers to still leave a message while they are out of the office, others may wish to disable such a feature and more strongly encourage a caller to direct their call to a delegate.

Figure 7:
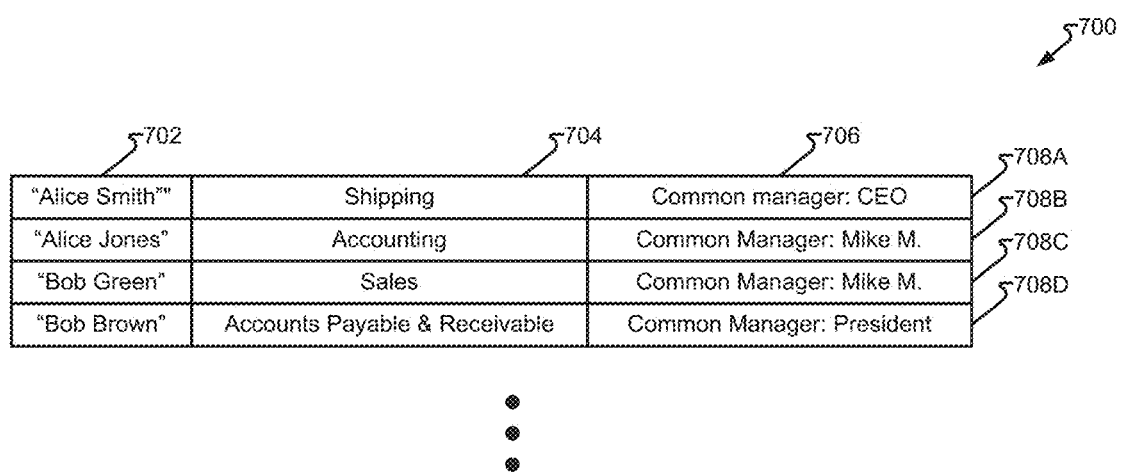
FIG. 7 depicts a fifth data structure in accordance with embodiments of the present disclosure.

FIG. 7 depicts data structure 700 in accordance with embodiments of the present disclosure. In one embodiment, data structure 600 defines a hierarchical structure. A similar structure may be provided for candidate delegates. In one embodiment, data structure 700 comprises candidate identifier field 702, and role field 704, and manager field 706 for a number of records 708. A candidate delegate matching, at least in part, a name or other identifier in candidate identifier field 702 may be further evaluate for a role provided in out-of-office email response 118 matching an entry in role field 704 and/or having a common more closely related in a hierarchical structure (such as determined, in part from record data structure 600).

For example, out-of-office email response 118 mentions "Alice for Accounting," and a partial match is found with candidate identifier field 702 with "Alice Smith" in record 708A and "Alice Jones" in record 708B. However, the value for role field 704 does not match the role parsed from out-of-office email response 118 and, therefore, record 708A down-weighted. The value of role field 704 does match and, therefore, record 708B up-weighted.

Additionally or alternatively, commonality with a particular management may be considered. For example, "Alice" may be very remotely related in a corporate structure such that their only common manager is the CEO as found in record 708A for manager field 706, whereas a lower-level match is provided in manager field 706 for record 708B.

As provided herein, server 114 may utilize a configured processor, such as executing instructions derived from a natural programming language or other programming language to select a candidate delegate as a delegate for a default or particular role utilized to configure out-of-office voice response 120. Ambiguities may arise when partial names of individuals or departments are utilized which match no delegate or a plurality of delegates. By determining a frequency of communications or other interactions, relationships within a corporate structure, role, and other attributes, a weighting may be provided that sways one candidate delegate over another. If a particular weighting is sufficient from one particular evaluation (e.g., a role matching role field 704), further analysis may be omitted. If confidence is low (e.g., a tie) then analysis utilizing additional data structure (e.g., a plurality of data structure 500, 700, etc.) may be utilized. In a worst-case scenario, and the weighting of two or more candidate delegates are determined to be sufficiently equal, a tie-breaker may be implemented, such as to prompt user 102 via email terminal 104 and/or telephone 106 to clarify the delegate. Additionally or alternatively, a decision or a weighting may also be determined, in whole or in part, based upon a historic out-of-office notification.

Figure 8:
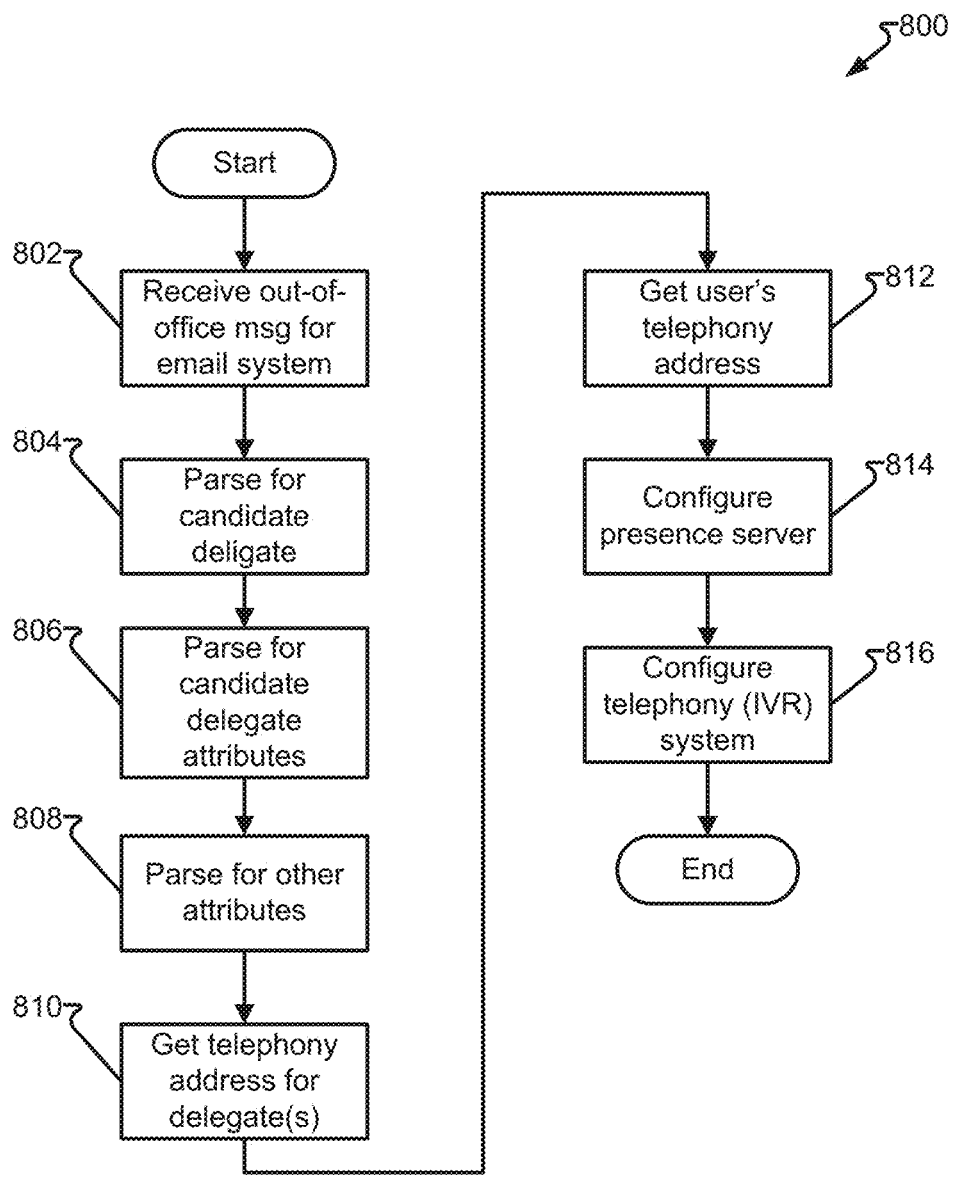
FIG. 8 depicts a process in accordance with embodiments of the present disclosure.

FIG. 8 depicts process 800 in accordance with embodiments of the present disclosure. Process 800 may be embodied as machine-executable instructions for execution by a processor, such as a processor of server 114 or other device providing some or all of the telephony services described herein and, optionally, additional services. In one embodiment, process 800 begins and, at step 802 receiving an out-of-office message, such as the creation of out-of-office email response 118. The email portion of a system, such as system 100, may utilize out-of-office email response 118, as is known in the prior art, to respond to incoming emails addressed to the email address of the user (e.g., user 102) with a response email comprising out-of-office email response 118. Next, in step 804, out-of-office email response 118 is parsed for candidate delegates. Step 804 may receive a sufficiently unique name, such as the full name of the delegate. If one or more candidate delegates are not uniquely identified, such as by using a first name only or a nickname, step 806 parse the email message for additional attributes such as an associated telephone number, email address, etc. that uniquely identifies the delegate within the system. Step 806 may also identify roles, titles, relationship within a corporate hierarchy, associations with the subscriber, etc.

Optionally, step 808 parses the email message for other attributes. The other attributes may include informal roles for a particular delegate (e.g., "Contact Bob for "Project Alpha"), start and end dates for the out-of-office message to be effective, default contact (e.g., "For anything else, contact Debbie."), etc. Step 810 accesses a telephony address for the delegates. This may be an internal telephone number, such as when the delegate is an extension on a system accessible to server 114, or a fully qualified telephone number when the delegate requires an external call. A fully qualified telephone number may depend on the relative location of server 114 to a delegate. As mentioned, this may only require an extension to be dialed but other numbers may be necessary, including a fully qualified number, such as an exit code (e.g., "9" on many systems), long distance or international dialing code (e.g., "1" or "01"), country code, city/region code, area code/numbering plan area (NPA), central office (NXX), line number, or other number or combinations thereof as required to place a call from server 114 to a delegate.

Next, step 812 gets the subscriber user's (e.g., user 102) telephone number, which may be utilized to configure a switch or other routing equipment to present an incoming call to an IVR or other telephony device to answer the call while the user is out of the office. This may include first ringing the user's associated telephony endpoint (e.g., telephone 106) and then engaging the automatic answering and presentation of out-of-office voice response 120, if not answered. Alternatively, the ringing of telephone 106 may be omitted and the incoming call answered only by the telephony device configured to present out-of-office voice response 120.

When a presence server is utilized, step 814 configures the presence server to indicate the user is out of the office. When a presence server is not implemented, processing may omit step 814 and proceed directly to step 816 to directly configure a telephony system. Step 816 may include providing an XML or other file, executing a configuration application, service, or routine, to cause the IVR system to be configured, for example, to be configured to present out-of-office voice response 120 to a caller that is derived from out-of-office email response 118.

Figure 9:
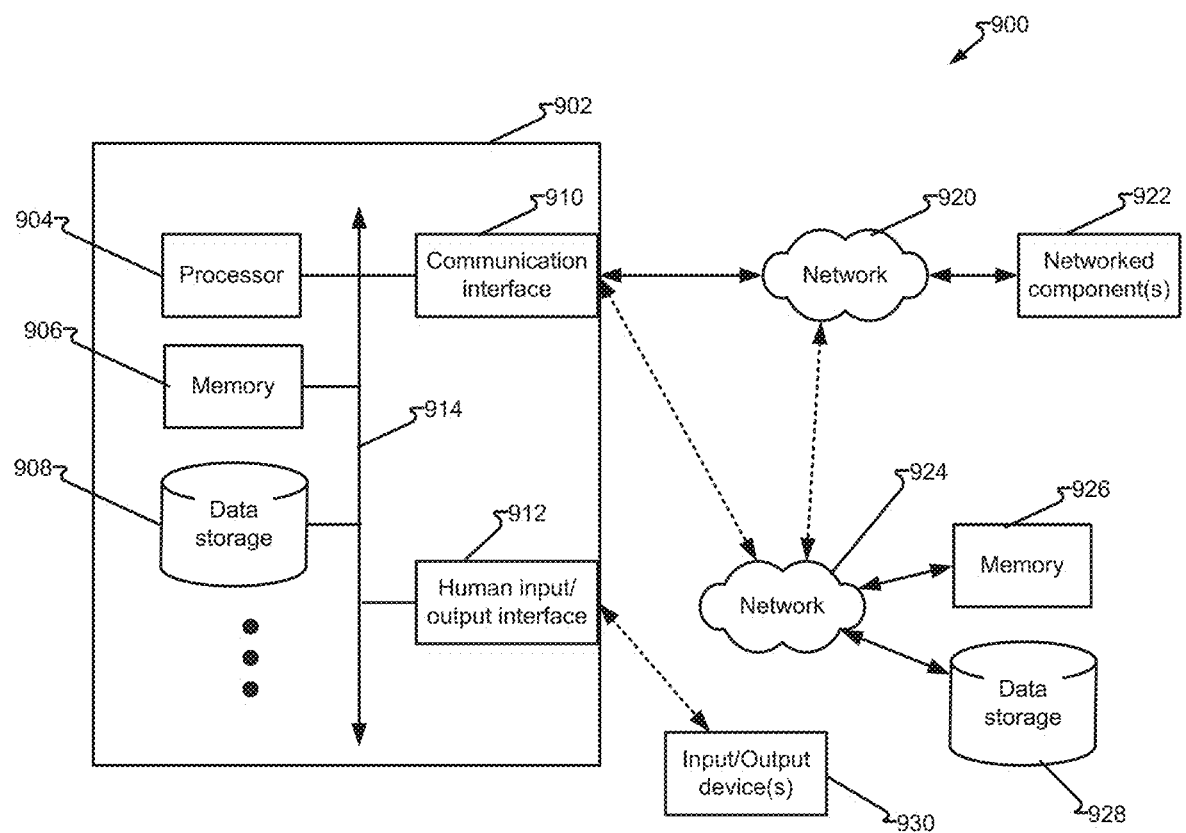
FIG. 9 depicts a second system in accordance with embodiments of the present disclosure.

FIG. 9 depicts system 900 in accordance with embodiments of the present disclosure. In one embodiment, email terminal 104, telephone 106, server 114, or a telephony device comprising one or more thereof may be embodied, in whole or in part, as device 902 comprising various components and connections to other components and/or systems. The components are variously embodied and may comprise processor 904. Processor 904 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 914, executes instructions, and outputs data, again such as via bus 914.

In addition to the components of processor 904, device 902 may utilize memory 906 and/or data storage 908 for the storage of accessible data, such as instructions, values, etc. Communication interface 910 facilitates communication with components, such as processor 904 via bus 914 with components not accessible via bus 914. Communication interface 910 may be embodied as a network port, card, cable, or other configured hardware device. Additionally or alternatively, human input/output interface 912 connects to one or more interface components to receive and/or present information (e.g., instructions, data, values, etc.) to and/or from a human and/or electronic device. Examples of input/output devices 930 that may be connected to input/output interface include, but are not limited to, keyboard, mouse, trackball, printers, displays, sensor, switch, relay, etc. In another embodiment, communication interface 910 may comprise, or be comprised by, human input/output interface 912. Communication interface 910 may be configured to communicate directly with a networked component or utilize one or more networks, such as network 920 and/or network 924.

Network 112 may be embodied, in whole or in part, as network 920. Network 920 may be a wired network (e.g., Ethernet), wireless (e.g., WiFi, Bluetooth, cellular, etc.) network, or combination thereof and enable device 902 to communicate with network component(s) 922. Additionally or alternatively, network 112 may be or comprise a telephony network (e.g., cellular telephone network, public switched telephone network (PSTN), private branch exchange (PBX), etc.). Accordingly, one or more other networks may be utilized. For example, network 924 may represent a second network, which may facilitate communication with components utilized by device 902.

For example, network 924 may be an internal network to a company, or other entity (e.g., academic entity, non-profit entity, building or other trusted space, etc.) whereby components are trusted (or at least more so) that networked components 922, which may be connected to network 920 comprising a public network (e.g., Internet) that may not be as trusted. Components attached to network 924 may include memory 926, data storage 928, input/output device(s) 930, and/or other components that may be accessible to processor 904. For example, memory 926 and/or data storage 928 may supplement or supplant memory 906 and/or data storage 908 entirely or for a particular task or purpose. For example, memory 926 and/or data storage 928 may be an external data repository (e.g., server farm, array, "cloud," etc.) and allow device 902, and/or other devices, to access data thereon. Similarly, input/output device(s) 930 may be accessed by processor 904 via human input/output interface 912 and/or via communication interface 910 either directly, via network 924, via network 920 alone (not shown), or via networks 924 and 920.

It should be appreciated that computer readable data may be sent, received, stored, processed, and presented by a variety of components. It should also be appreciated that components illustrated may control other components, whether illustrated herein or otherwise. For example, one input/output device 930 may be a router, switch, port, or other communication component such that a particular output of processor 904 enables (or disables) input/output device 930, which may be associated with network 920 and/or network 924, to allow (or disallow) communications between two or more nodes on network 920 and/or network 924. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARIVI926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
    a processor, wherein the processor comprises at least one processing device;
    a data storage comprising a storage device;
    a first network interface to a first network; and
    an input-output component;
    wherein the processor is configured to:
        receive, from the input-output component, an out-of-office text message from a user;
        parse the out-of-office text message to identify a candidate delegate therein;
        match, in the data storage, a record structure comprising a first record associating a delegate telephony address with the candidate delegate and, upon the matching, identify the candidate delegate as a delegate;
        access, in the data storage, a record structure comprising a second record associating a user telephony address with the user;
        format an out-of-office telephony message and further comprising indicia of the delegate and indicia of the user telephony address of the delegate; and
        configure a user telephony device to present the out-of-office telephony message to a caller of a call destined for the user telephony device; and
        wherein the user telephony message comprises a prompt associate with the indicia of the delegate and upon receiving a response from the caller in accordance with the prompt, forwarding the call to the user telephony address of the delegate.

2. The system of claim 1, wherein the processor is further configured to:
    parses the out-of-office text message to identify the candidate delegate therein comprises identifying a plurality of candidate delegates; and
    match the record structure comprising the first record associating the delegate telephony address with the candidate delegate, comprises, a weighted matching in association with a degree of match to at least one of record structure comprising a third data structure, wherein the third data structure comprises at least one of frequency of communications with at least one of the plurality of candidate delegates, frequency of calendar events shared with at least one of the plurality of candidate delegates, a role of the at least one of the plurality of candidate delegates, or a position of the at least one of the plurality of candidate delegates; and
    identify the candidate delegate from the plurality of candidate delegates as having the highest weighted matching from the each of the plurality of candidate delegates.

3. The system of claim 1, wherein the processor is further configured to:
    parse the out-of-office text message to identify the candidate delegate therein comprises identifying a plurality of candidate delegates, utilizing a natural programming language to evaluate additional portions of the out-of-office text message, other than a portion comprising the candidate delegate, to determine an attribute of at least one of the plurality of candidate delegates; and identify the candidate delegate from the plurality of candidate delegates as having the attribute best matching each of the plurality of candidate delegates.

4. The system of claim 1, wherein the telephony device, upon being configured to present the out-of-office telephony message and further upon receiving a call destined for the user, answers the call and, upon being connected to the caller, presents the out-of-office telephony message.

5. The system of claim 1, wherein configuring the telephony device to present the out-of-office telephony message to the caller, further comprises, configuring a presences server providing presence data to subscribing presence devices.

6. The system of claim 1, wherein the user telephony address of the delegate comprises at least one of an extension on a private branch exchange (PBX), a destination address on a public switched telephone number, a voice over internet protocol (VoIP) address, or a Session Initiation Protocol (SIP) address.

7. The system of claim 1, wherein indicia of the delegate comprises at least one of a full name of the delegate, a truncated name of the delegate, a role of the delegate, a department of the delegate, a default-role of the delegate.

8. The system of claim 1 wherein the indicia of the user telephony address of the delegate comprises at least one of a dual-tone multi-frequency signaling (DTMF) sequence or a spoken indicia.

9. The system of claim 1, wherein the telephony device formats the out-of-office telephony message upon receiving the call.

10. A method, comprising:
receiving, from an input-output component, an out-of-office text message from a user;
parsing the out-of-office text message to identify a candidate delegate therein;
matching, in a data storage, a record structure comprising a first record associating a delegate telephony address with the candidate delegate and, upon the matching, identifying the candidate delegate as a delegate;
accessing, in the data storage, a record structure comprising a second record associating a user telephony address with the user;
formatting an out-of-office telephony message and further comprising indicia of the delegate and indicia of the user telephony address of the delegate; and
configuring a user telephony device to present the out-of-office telephony message to a caller of a call destined for the user telephony device; and
wherein the user telephony message comprises a prompt associate with the indicia of the delegate and upon receiving a response from the caller in accordance with the prompt, forwarding the call to the user telephony address of the delegate.

11. The method of claim 10, further comprising:
parsing the out-of-office text message to identify the candidate delegate therein comprises identifying a plurality of candidate delegates; and
matching a record structure comprising the first record associating the delegate telephony address with the candidate delegate, comprising, a weighted matching in association with a degree of match to at least one of a record structure comprising a third data structure, wherein the third data structure comprises at least one of frequency of communications with at least one of the plurality of candidate delegates, frequency of calendar events shared with at least one of the plurality of candidate delegates, a role of the at least one of the plurality of candidate delegates, or a position of the at least one of the plurality of candidate delegates; and
identifying the candidate delegate from the plurality of candidate delegates as having the highest weighted matching from the each of the plurality of candidate delegates.

12. The method of claim 10, further comprising, receiving a call destined for the user and, in response thereto, answering the call and, upon being connected to the caller, presenting the out-of-office telephony message.

13. The method of claim 10, wherein configuring the telephony device to present the out-of-office telephony message to the caller, further comprises, configuring a presences server providing presence data to subscribing presence devices.

14. The method of claim 10, wherein the user telephony address of the delegate comprises at least one of an extension on a private branch exchange (PBX), a destination address on a public switched telephone number, a voice over internet protocol (VoIP) address, or a Session Initiation Protocol (SIP) address.

15. The method of claim 10, wherein indicia of the delegate comprises at least one of a full name of the delegate, a truncated name of the delegate, a role of the delegate, a department of the delegate, a default-role of the delegate.

16. The method of claim 10, wherein the indicia of the user telephony address of the delegate comprises at least one of a dual-tone multi-frequency signaling (DTMF) sequence or a spoken indicia.

17. The method of claim 10, wherein the formatting of the out-of-office telephony message occurs upon receiving the call.

18. A system, comprising:
means to receive, from an input-output component, an out-of-office text message from a user;
means to parse the out-of-office text message to identify a candidate delegate therein;
means to match, in data storage, a record structure comprising a first record associating a delegate telephony address with the candidate delegate and, upon the matching, identify the candidate delegate as a delegate;
means to access, in a data storage, a record structure comprising a second record associating a user telephony address with the user;
means to format an out-of-office telephony message and further comprising indicia of the delegate and indicia of the user telephony address of the delegate, wherein the user telephony message comprises a prompt associate with the indicia of the delegate;
means to configure a user telephony device to present the out-of-office telephony message to a caller of a call destined for the user telephony device; and
means to forward the call to the user telephony address of the delegate.

19. The system of claim 18, wherein the means to format the out-of-office telephony message comprises means to format the out-of-office telephony message occurs upon receiving the call.

20. The system of claim 18, wherein the indicia of the user telephony address of the delegate comprises at least one of a dual-tone multi-frequency signaling (DTMF) sequence or a spoken indicia.

* * * * *